(12) United States Patent  (10) Patent No.: US 8,314,953 B2
Robinson  (45) Date of Patent: Nov. 20, 2012

(54) SYSTEM AND METHOD FOR PROCESSING A HIGHLIGHT COLOR PRINT JOB

(75) Inventor: David C Robinson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1474 days.

(21) Appl. No.: 11/851,823

(22) Filed: Sep. 7, 2007

(65) Prior Publication Data

US 2009/0066973 A1    Mar. 12, 2009

(51) Int. Cl.
G06K 15/00 (2006.01)
G06F 15/00 (2006.01)
G06F 3/12 (2006.01)

(52) U.S. Cl. ........ 358/1.14; 358/1.9; 358/1.13; 358/1.15
(58) Field of Classification Search .................. None
See application file for complete search history.

(56) References Cited

U.S. PATENT DOCUMENTS

| | | |
|---|---|---|
| 4,078,929 A | 3/1978 | Gundlach |
| 4,475,156 A | 10/1984 | Federico et al. |
| 4,819,026 A | 4/1989 | Lange et al. |
| 5,080,988 A | 1/1992 | Germain et al. |
| 5,113,494 A | 5/1992 | Menendez et al. |
| 5,129,639 A | 7/1992 | DeHority |
| 5,179,637 A | 1/1993 | Nardozzi |
| 5,220,674 A | 6/1993 | Morgan et al. |
| 5,226,112 A | 7/1993 | Mensing et al. |
| 5,287,194 A * | 2/1994 | Lobiondo ............. 358/296 |
| 5,493,634 A | 2/1996 | Bonk et al. |
| 5,524,181 A * | 6/1996 | Sung et al. .............. 358/1.4 |
| 5,995,723 A | 11/1999 | Sperry et al. |
| 6,078,906 A | 6/2000 | Huberman |
| 6,526,240 B1 | 2/2003 | Thomas et al. |
| 7,242,302 B2 | 7/2007 | Rai et al. |
| 2003/0011812 A1* | 1/2003 | Sesek et al. ............. 358/1.15 |
| 2004/0263906 A1* | 12/2004 | Uchida et al. ........... 358/1.18 |
| 2008/0112001 A1* | 5/2008 | Hartupee et al. .......... 358/1.9 |
| 2008/0198015 A1* | 8/2008 | Lawrence et al. ........ 340/572.4 |

\* cited by examiner

*Primary Examiner* — Vincent Rudolph (57) ABSTRACT

A computer implemented method is provided for printing a highlight color print job in a system including a local printing system with a computer. The computer communicates with multiple client printing systems by way of a network. The method includes determining, with the computer, that the highlight color print job cannot be processed at the local printing system because a selected highlight colorant is unavailable. Information from one of the multiple client printing systems indicating that the one of the multiple client printing systems is qualified to successfully process the highlight color print job within a selected time interval is obtained. The highlight color print job is then forwarded to the one of the multiple client printing systems qualified to successfully process the highlight color print job within the selected time interval.

3 Claims, 6 Drawing Sheets

SYSTEM AND METHOD FOR PROCESSING A HIGHLIGHT COLOR PRINT JOB

BACKGROUND AND SUMMARY

The disclosed embodiments relate generally to a method for processing highlight color print jobs and, more particularly, to an approach in which a highlight color is forwarded from a first printing machine to second printing machine to take advantage of the current or potential availability of a highlight colorant at the second printing machine.

As disclosed in U.S. Pat. No. 4,078,929 to Gundlach, a process referred to as "highlight color imaging" has been accomplished by employing basic xerographic techniques. U.S. Pat. No. 4,078,929 discloses the use of tri-level xerography as a means to achieve single-pass highlight color imaging. As disclosed therein the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the charge pattern. In another embodiment, the toner particles are presented to the charge pattern by a pair of magnetic brushes. Each brush supplies a toner of one color and one charge. In yet another embodiment, the development systems are biased to about the background voltage. Such biasing results in a developed image of improved color sharpness.

As follows from the description of U.S. Pat. No. 4,078,929, a highlight color printing machine can operate in one of three operational modes, namely "highlight color", "monochrome-color" or "monochrome-black". Additionally, the toner or marking material used to generate highlight or monochrome color can assume one of a plurality of colors. Preferably, a print job is executed on the highlight color printing machine by providing a program indicating selections for color printing mode and marking material color. In executing a print job, it is not always possible, from a user's point of view, to control either the mode in which the machine is operated or the color in which the machine prints. For example, when the printing machine runs out of the color toner called for by the print job program, typically, the print job is faulted so that the program submitter must either provide a new toner selection consistent with what is available at the printing machine or wait until the programmed color toner is available. In another example, a print job is faulted when its corresponding program calls for execution of the print job in a color printing mode which is not presently available.

U.S. Pat. No. 5,524,181 to Sung et al. discloses a method for highlight colorant substitution in which print job faulting can be avoided, notwithstanding the absence of the highlight colorant originally called for by the print job. In particular, the method includes the steps of programming a job to produce a first selected quantity of prints with a first marking material (of one highlight colorant type) or a second marking material (of a second highlight colorant type) in the event the first marking material is unavailable. If it is determined that the printing system is unable to produce the first selected quantity of prints with the first marking, the printing machine produces the first selected quantity of prints with the second marking material.

While U.S. Pat. No. 5,524,181 is well suited for its intended purpose, it does not appear to contemplate the possibility of using a print job forwarding system on a network to avoid the need for performing a highlight colorant substitution The pertinent portions of all of the above-mentioned patents are incorporated herein by reference.

In accordance with a first aspect with the disclosed embodiments there is disclosed a computer implemented method for printing a highlight color print job in a system including a local printing system with a computer. The computer communicates with multiple client printing systems by way of a network, and the highlight color print job includes information regarding a selected highlight colorant to be used in printing the highlight color print job. The method includes: (A) determining, with the computer, that the highlight color print job cannot be processed at the local printing system because the selected highlight colorant is unavailable; (B) obtaining information from one of the multiple client printing systems indicating that the one of the multiple client printing systems is qualified to successfully process the highlight color print job within a selected time interval; and (C) responsive to said information obtaining of (B), forwarding the highlight color print job to the one of the multiple client printing systems qualified to successfully process the highlight color print job within the selected time interval In accordance with a second aspect with the disclosed embodiments there is disclosed a computer implemented method for printing a highlight color print job in a system including a local printing system with a computer. The computer communicates with multiple client printing systems by way of a network, and the highlight color print job includes information regarding a selected highlight colorant to be used in printing the highlight color print job. The method includes: (A) determining that the highlight color print job cannot be processed with the local printing system within a selected time interval; (B) determining, with the computer, that at least one of the one or more client printing systems is qualified to successfully process the highlight color print job within the selected time interval; and (C) causing the highlight color print job to be made available to one of the at least one or more client printing systems that is determined to be qualified for successfully processing the highlight color print job within the selected time interval so that the highlight color print job can be processed within the selected time interval.

In accordance with a third aspect of the disclosed embodiments there is disclosed a computer implemented method for printing a highlight color print job in a system including a one or more client printing systems communicating with a network. The method includes: (A) receiving a request from the network at one of the one or more client printing systems, the request seeking information regarding whether the highlight color print job can be processed at the one of the one or more client printing systems within a selected time interval; (B) determining, at the one of the one or more client printing systems, whether the highlight color print job can be processed at the one of the one or more client printing systems within the selected time interval; (C) transmitting a response from the one of the one or more client printing systems to the network indicating that the highlight color print job can be processed at the one of the one or more client printing systems within the selected time interval; and (D) processing the highlight color print job at the one of the one or more client printing systems within the selected time interval in response to receiving either (1) the highlight color print job from the network, or (2) an instruction indicating that the highlight color print job is to be retrieved from a location on the network.

BRIEF DESCRIPTION OF THE DRAWINGS

Various aspects of the disclosed embodiments will become apparent from the following description, the description being used to illustrate at least one preferred embodiment when read in conjunction with the accompanying drawings.

DESCRIPTION OF DISCLOSED EMBODIMENTS

Figure 1:
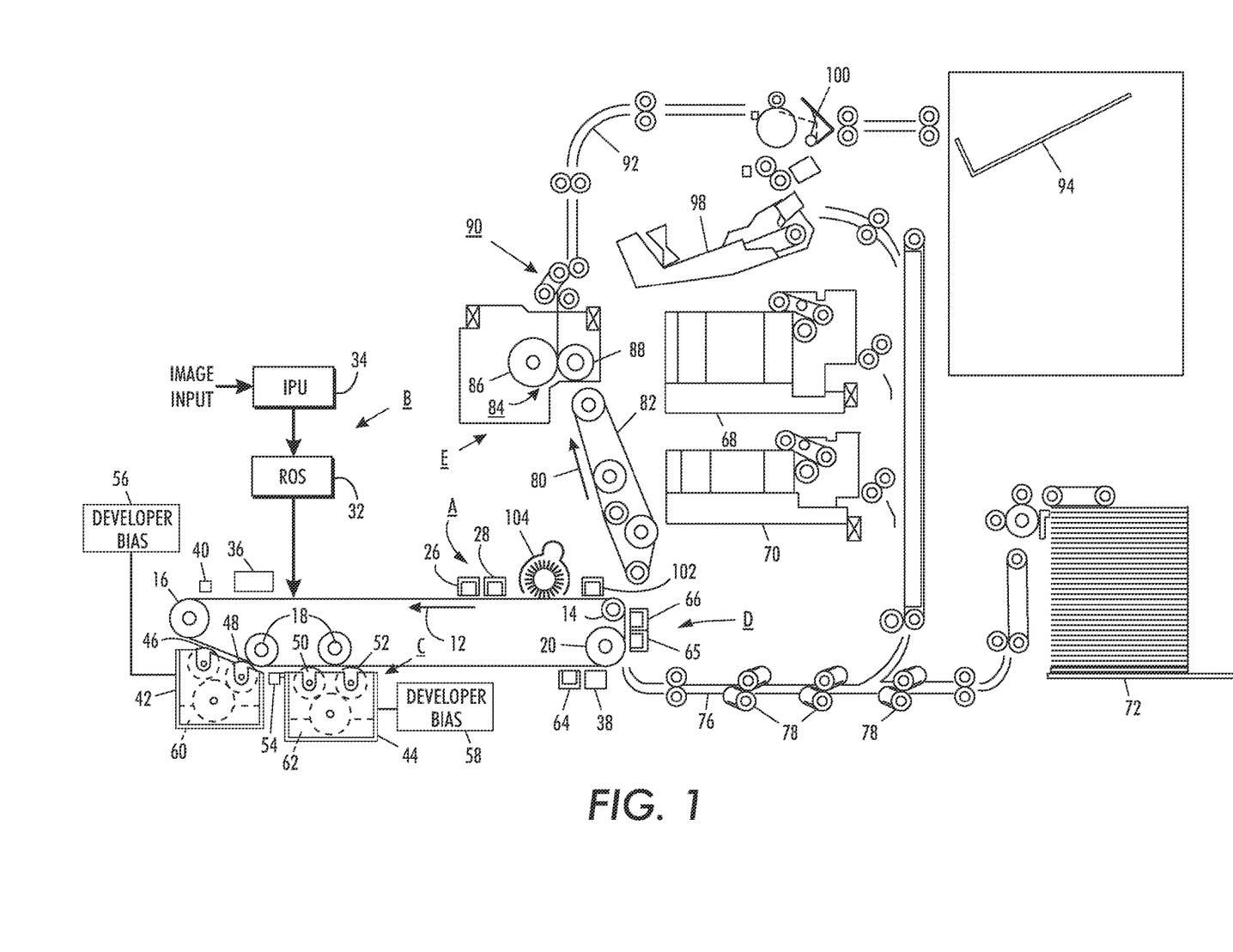
FIG. 1 is a planar, schematic view of a printing machine capable of printing a highlight color print job.

Referring to FIG. 1, a printing machine, suitable for use with the disclosed embodiments, employs a photoreceptor belt 10 having a charge retentive surface. Belt 10 moves in the direction of arrow 12 to advance successive portions of the belt sequentially through the various processing stations disposed about the path of movement thereof.

Belt 10 is entrained about stripping roller 14, tension roller 16, idler rollers 18, and drive roller 20. Drive roller 20 is coupled to a motor (not shown) by suitable means such as a belt drive. Belt 10 is maintained in tension by a pair of springs (not shown) resiliently urging tension roller 16 against belt 10 with the desired spring force. Both stripping roller 14 and tension roller 16 are rotatably mounted. These rollers are idlers which rotate freely as belt 10 moves in the direction of arrow 12. Portions of the belt 10 pass through charging station A. At charging station A, a pair of corona devices 26 and 28 charge successive portions of the photoreceptor belt 10 to a relatively high, substantially uniform negative potential.

At exposure station B, the uniformly charged photoreceptor is exposed to a laser based scanning device 32 or ROS, which, in accordance with a driving electronic subsystem ("ESS") 34, discharges the photoreceptor to one of three charge levels in accordance with a stored image. This records an electrostatic latent image on the belt which corresponds to the informational area contained within electronically stored original information.

In one example of operation, the charge retentive surface of the belt 10, which is initially charged to a voltage $V_0$, undergoes dark decay to a level $V_{CAD}$ equal to about −900 volts to form CAD images. Upon being exposed at the exposure station B, the photoreceptor is discharged to $V_{DAD}$ equal to about −100 volts to form a DAD image which is about zero or ground potential in the highlight color parts of the image. During exposure, the charge retentive surface of the belt 10 is also discharged to $V_{White}$, the magnitude of $V_{White}$ equaling approximately −500 volts in the background (white) areas.

Referring still to FIG. 1, a patch generator is designated by the numeral 36. In one example, the generator 36 comprises a conventional exposure device, and serves to record test or control patches in inter-document zones (not shown), the test patches being used both in a developed and undeveloped condition for controlling various process functions. An Infra-Red densitometer (IRD) 38 is utilized to sense or measure the reflectance of test patches after they have been developed. It should be recognized that each test patch can be recorded and developed with multiple toners having differing polarities. Thus, the patch generator 36 is preferably adapted to provide different levels of exposure for any one given inter-document zone. A first electrostatic voltmeter ($ESV_1$) 40 is positioned downstream of the patch generator 36 for monitoring certain electrostatic charge levels (such as $V_{DAD}$, $V_{CAD}$, and $V_{White}$) on various portions of the photoreceptive belt 10.

At development station C, a magnetic brush development system advances developer materials into contact with an electrostatic latent image on the photoreceptor. The development station C comprises a first developer housing 42 and second developer housing 44. Preferably, the housing 42 contains a pair of magnetic brush developer rollers 46, 48 while the housing 44 contains a pair of magnetic brush developer rollers 50, 52. Each pair of rollers advances its respective developer material into contact with the latent image. Appropriate developer biasing is accomplished via power supplies 56 and 58, the power supplies 56, 58 being electrically coupled with respective developer housings 42, 44. A pair of toner replenishment devices (not shown) are provided for replacing the toner as it is depleted from the developer housing structures 42, 44.

Color discrimination in the development of the electrostatic latent image is achieved by passing the photoreceptor past the two developer housings 42 and 44 in a single pass with the magnetic brush rolls 46, 48, 50 and 52 electrically biased to voltages which are offset from the background voltage $V_{White}$ in a direction depending on the polarity of toner in the housing. In one example of the printing machine of FIG. 1, the housing 42 contains negatively charged blue conductive magnetic brush (CMB) developer 60. Accordingly, the blue toner is driven to the least highly charged areas at the potential $V_{DAD}$ of the latent images by the electrostatic development field ($V_{DAD}$-$V_{COLOR\ BIAS}$) between the photoreceptor and the development rolls 46, 48. On the other hand, the housing 44 contains positively charged black toner 62. Accordingly, the black toner is urged towards the parts of the latent images at the most highly charged potential $V_{CAD}$ by the electrostatic development field ($V_{CAD}$-$V_{BLACK\ BIAS}$) existing between the photoreceptor and the development rolls 50, 52. A second electrostatic voltmeter ($ESV_2$) 54 is positioned downs of the first developer housing 42 for monitoring certain electrostatic charge levels (such as $V_{DAD}$, $V_{CAD}$, and $V_{White}$) on various portions of the photoreceptive belt 10.

The rollers 46 and 48 may be biased using a chopped DC bias via power supply 56, while the rollers 50 and 52 may be biased using a chopped DC bias via power supply 58. The expression chopped DC ("CDC") bias refers to the process of alternating a developer housing between two potentials, namely a first potential roughly representing the normal bias for the DAD developer, and a second potential roughly representing a bias that is considerably more negative than the normal bias. The first potential is identified as $V_{BIAS\ LOW}$ while the second potential as $V_{BIAS\ HIGH}$. Further details regarding CDC biasing are provided in U.S. Pat. No. 5,080,988 to Germain et al., the pertinent portions of which are incorporated herein by reference.

Because the composite image developed on the photoreceptor consists of both positive and negative toner, a negative pretransfer dicorotron 64 is employed to condition the toner for effective transfer to a substrate using positive corona discharge. The concept of the invention would not be altered by conditioning the toner for transfer with negative corona discharge. Subsequent to providing pretransfer, belt 10 advances the developed latent image to transfer station D. At transfer station D, a sheet of support material such as a paper copy sheet is moved into contact with the developed latent images on belt 10 and a corona generating device 65 charges the copy sheet to the proper potential so that it is tacked to photoreceptor belt 10 and the toner powder image is attracted from photoreceptor belt 10 to the sheet. After transfer, a corona generator 66 charges the copy sheet with an opposite polarity to detack the copy sheet for belt 10, whereupon the sheet is stripped from belt 10 at stripping roller 14.

Sheets of support material are advanced to transfer station D from supply trays 68, 70 and 72, which supply trays may hold different quantities, sizes and types of support materials. Sheets are advanced to transfer station D along conveyor 76 and rollers 78. After transfer, the sheet continues to move in the direction of arrow 80 onto a conveyor 82 which advances the sheet to fusing station E.

Fusing station E, which includes a fuser assembly, indicated generally by the reference numeral 84, serves to permanently affix the transferred toner powder images to the sheets. The fuser assembly 84 may include a heated fuser roller 86 adapted to be pressure engaged with a back-up roller 88 with the toner powder images contacting fuser roller 86. In this manner, the toner powder image is permanently affixed to the sheet.

After fusing, copy sheets bearing fused images are directed through decurler 90. Chute 92 guides the advancing sheet from decurler 90 to catch tray 94 or a finishing station for binding, stapling, collating etc. and removal from the machine by the operator. Alternatively, the sheet may be advanced to a duplex tray 98 from duplex gate 100 from which it will be returned to the processor and conveyor 76 for receiving second side copy.

A pre-clean corona generating device 102 is provided for exposing the residual toner and contaminants (hereinafter, collectively referred to as toner) to positive charges to thereby shift the charge distribution thereon in a positive direction for more effective removal at cleaning station F. The cleaning station F may further include an electrically insulative, rotatably mounted cleaning member designated by the numeral 104. The insulative brush is capable of being charged up during rotation, via triboelectric interaction with other cleaning members, for attracting toner(s) of the opposite polarity. Alternatively, the brush could be a conductive brush adapted to be biased for attracting toner(s) of the opposite polarity. A conductive brush suited for such cleaning is disclosed in U.S. Pat. No. 4,819,026 to Lange et al., the pertinent portions of which are incorporated by reference.

Figure 2:
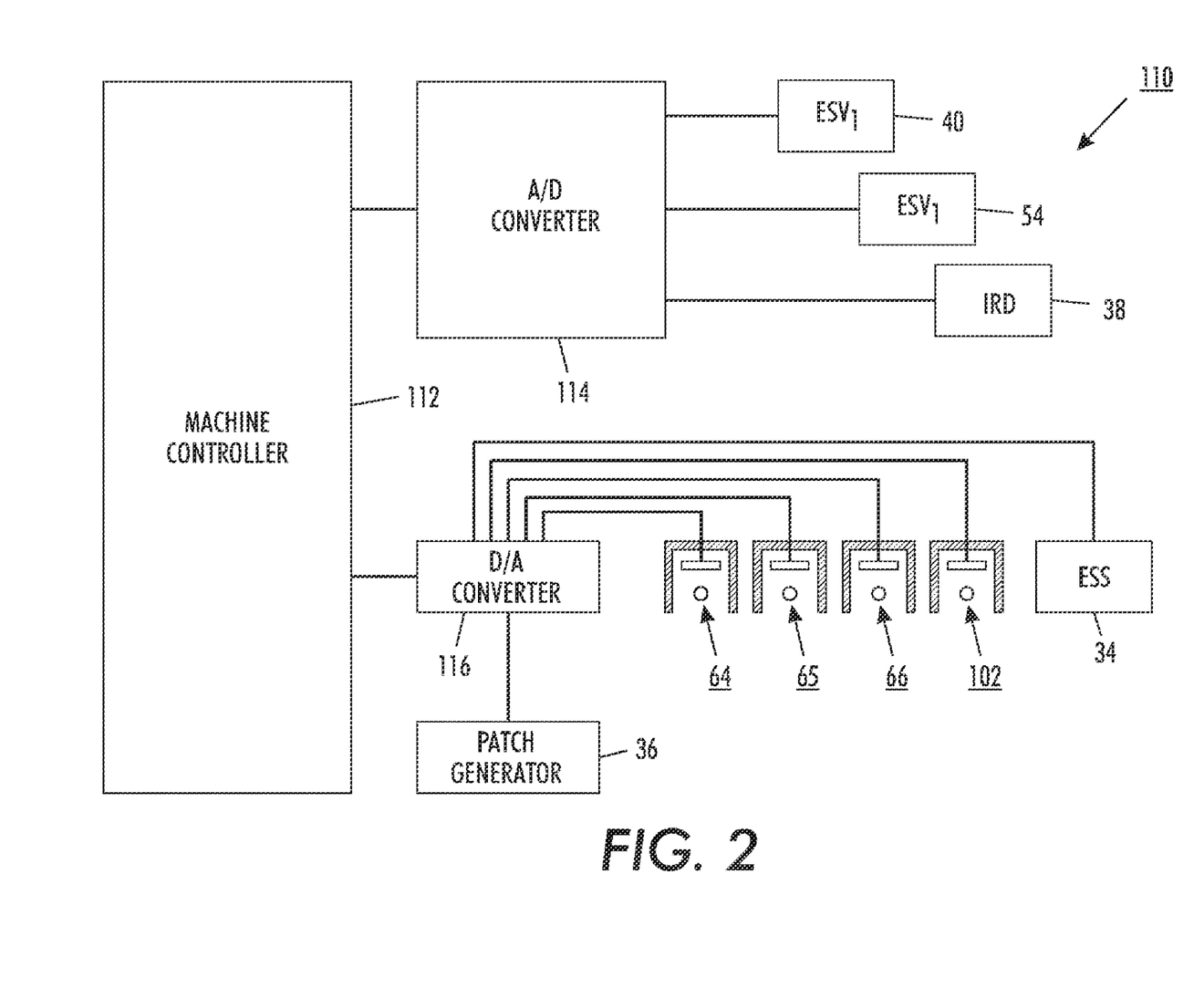
FIG. 2 is a planar, schematic view of a circuit used to control various components of the printing machine of FIG. 1.

Referring to FIG. 2, a control circuit for use with the above-described printing machine is designated with the numeral 110. In the example of FIG. 2, the IRD 38, $ESV_1$ 40 and $ESV_2$ 54 are coupled with a machine controller 112 by way of an A/D converter 114, while the ESS 34, the patch generator 36 and the corona devices 64-66 and 102 are coupled with the controller 112 by way of a D/A converter 116. As will be appreciated by those skilled in the art, the machine controller 112 includes all of the appropriate circuitry for controlling the various devices coupled therewith and suitable memory for storing reference values corresponding to any measurements received from the $ESV_1$, $ESV_2$ or the IRD. In one embodiment the machine controller 112 might comprise a virtual machine control apparatus of the type disclosed in U.S. Pat. No. 4,475,156 to Federico et al., the pertinent portions of which are incorporated herein by reference.

Referring still to FIG. 2, pre-selected current levels are respectively applied across the corona devices 64-66 and 102 during cycle-up or runtime to enable efficient transfer, detack and cleaning. That is, the respective applied current levels through the corona devices 64-65 are set to obtain optimal transfer, while the respective applied current levels through corona devices 66 and 102 are set to obtain optimal detack and cleaning.

It should be appreciated that the print job forwarding approach of the disclosed embodiments, a detailed description of which is supplied below, could be practiced in a variety of color printing machines other than the one described above. For instance, the sort of highlight color functionality achieved with the above-described printing system could also be achieved with either the Xerox iGen3™ 110 Digital Production Press or DocuTech™ 180 Highlight Color Printing System.

Figure 3:
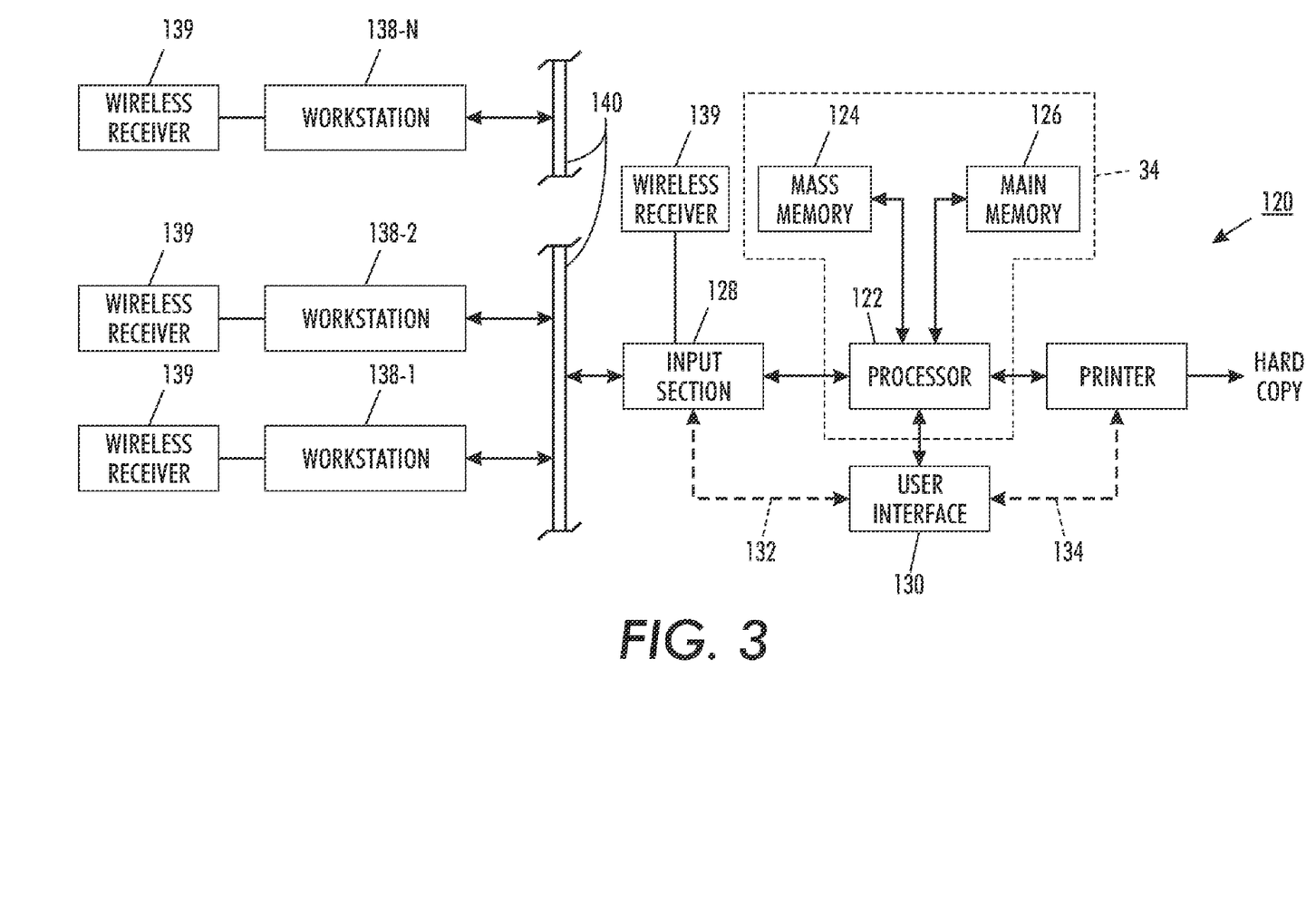
FIG. 3 is a schematic, block diagrammatic view of a network printing system, including a network connected printing machine with a digital front end.

Referring to FIG. 3, there is an electronic document processing system 120 illustrating one possible environment for the above-described printing machine of FIG. 1. The document processing system 120 includes the ESS 34, the ESS (also referred to herein as "digital front end (DFE)") 34 including a digital processor 122 with a main memory 124 and a mass memory 126. The document processing system 120 further includes an input section 128 for providing a job written in a printer page description language (PDL), and the printing machine of FIG. 3 for printing hardcopy renderings of selected image components obtained from the PDL. Furthermore, there is a user interface 130 for enabling a user to interact with the processor 122, the input section 128, and the printing machine.

As will be understood, the user interface 130 collectively represents the input devices through which the user enters image editing and manipulation instructions for the processor 122. Additionally, the interface 130 represents the output devices through which the user receives feedback with respect to the actions that are taken in response to the instructions that are entered by the user or otherwise, such as under program control. For example, the user interface 130 generally includes a keyboard or the like for entering use instructions, a monitor for giving the user a view of the process that is being performed by the processor 122, and a cursor controller for enabling the user to move a cursor for making selections from and/or for entering data into a process that is being displayed by the monitor (none of these conventional components is shown).

The illustrated document processing system 120 is centralized, so it has been simplified by assuming that all control instructions and all image editing and manipulation instructions are executed by the processor 122 under program control. In practice, however, the execution of these instructions may be handled by several different processors, some or all of which may have their own main memory and even their own mass memory. Likewise, either or both of the input section 128 and the printer may have their own respective user interface, as indicated by the dashed lines 132 and 134, respectively. Indeed, it will be evident that the document processing system 120 could be reconfigured to have a distributed architecture to operate with a remote input section and/or a remote printer (not shown). Data could be transferred from and to such remote input section and printer terminals via dedicated communication links or switched communication networks (also not shown).

In one embodiment, the input section 128 communicates with a plurality of remote clients, such as workstations 138-1 through 138-N by way of a network 140. Further details regarding network printing arrangements may be obtained by reference to the following references, the pertinent portions of which are incorporated herein: U.S. Pat. No. 5,129,639 to DeHority; U.S. Pat. No. 5,226,112 to Mensing et al.; and U.S. Pat. No. 5,995,723 to Sperry et al. The following patents, the pertinent portions of which are included herein by reference, also disclose print servers or services appropriate for transmitting/processing jobs within a network: U.S. Pat. No. 5,113,494 to Menendez et al.; U.S. Pat. No. 5,179,637 to Nardozzi; and U.S. Pat. No. 5,220,674 to Morgan et al. It should be appreciated that the print job forwarding approach of the disclosed embodiments is facilitated by communication with network clients having at least some (if not all) of the functionality associated with FIGS. 1-3.

Referring still to FIG. 3, the document processing system 120 and each one of the workstations 138-1 through 138-N may include a wireless receiver 139. In one example, the receiver may be part of an RFID or IR system for receiving a suitable signal (such as radio frequency or infrared signal) transmitted from a toner or ink container. Further details regarding RFID detection, of the type suitable for use with the disclosed embodiments is disclosed in U.S. Pat. No. 7,242,302 to Rai et al., the pertinent portions of which are incorporated herein by reference. It will be appreciated by those skilled in the art that the disclosed embodiments could be implemented with a number of different wireless emitter/receiver systems other than a RFID system, such as an infrared based system.

Figure 4:
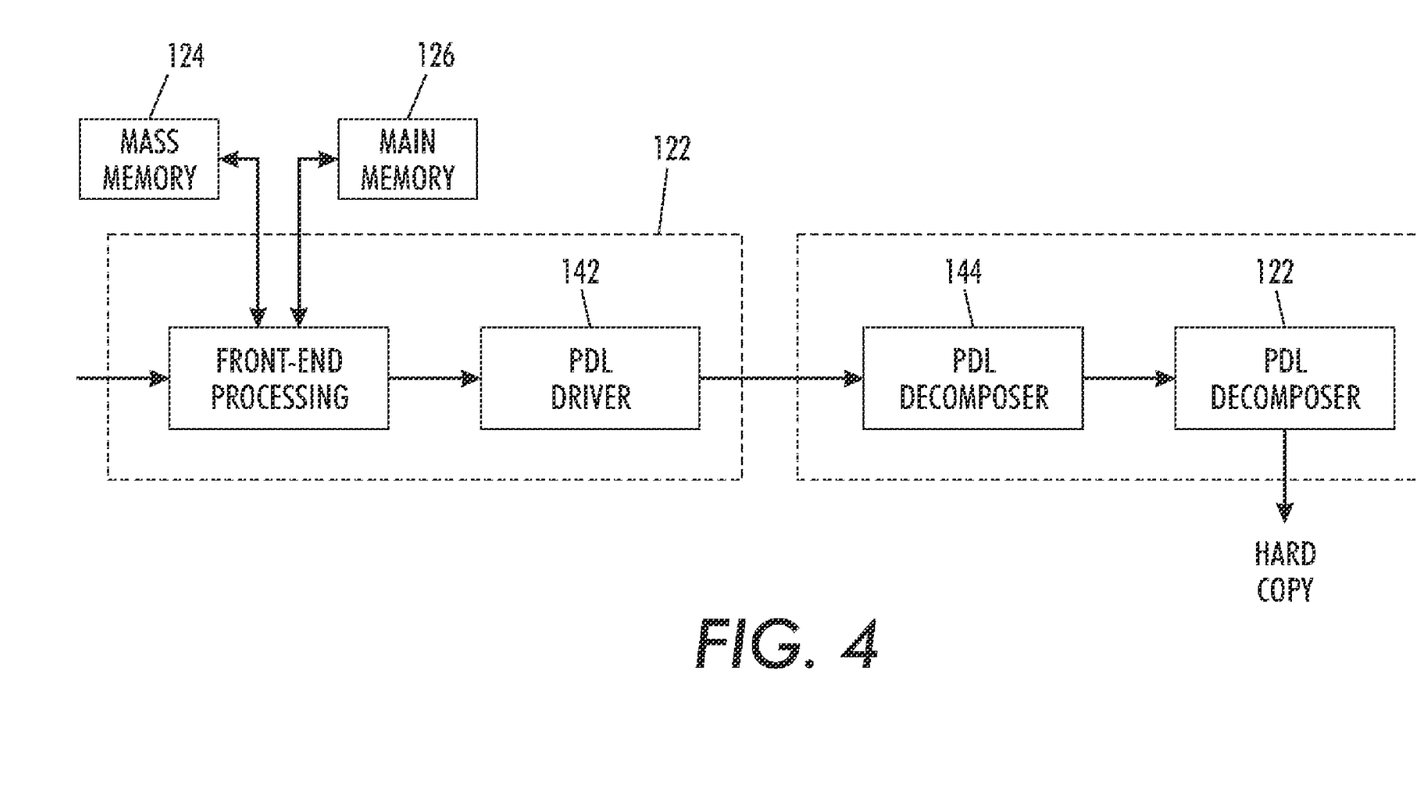
FIG. 4 is a schematic, block diagrammatic view of a processor/printer interface for the printing machine of FIG. 3.

Referring now to FIG. 4, the processor 122 preferably includes a PDL driver 142 for transferring to the printer PDL descriptions of the electronic document files that are selected for printing. Thus, the printing machine (FIGS. 1 and 3) is illustrated as having a PDL decomposer 144 for decomposing such PDL descriptions to produce corresponding bitmapped image file. It will be appreciated, particularly in view of the discussion in U.S. Pat. No. 5,493,634 to Bonk et al., the pertinent portions of which are incorporated by reference, that the decomposer 144 is capable of receiving PDL files from mass memory, such as disk, or from off the network on the fly. As will be appreciated by those skilled in the art, the processor 122 may be provided through a DFE, a detailed description of which is provided in U.S. Pat. No. 6,526,240 to Thomas et al., the pertinent portions of which are incorporated by reference.

Referring now to a highlight color print job forwarding approach, it may be noted that Xerox XPIF (job ticketing format) job ticketing supports the definition of a requested highlight color (HLC) with the field <highlight-colorant>. When a job is submitted to a HLC printing device, the requested <highlight colorant> is compared to the print system's loaded HLC color. If the <highlight colorant> is not a match to the device's loaded color and a corresponding "mismatch action" does not allow printing with the loaded color, an associated DFE (of the type described above) may poll HLC devices on a network to understand if another HLC printing device is capable of fulfilling the <highlight colorant> request. The polling may be performed with Xerox's IPP (Internet Print Protocol) which allows printing systems to inform clients of the job ticketing features available with the printing system. A new IPP attribute <colorant-ready> may be added to Xerox's common print semantics specification (CPSS). If another device is located with the <colorant-ready> that equals the <highlight colorant> for the job, the job may be job forwarded using a known "job forwarding" functionality available on one of the DFE embodiments of the Xerox iGen3™ 110 Digital Production Press (the DFE embodiment being referred to as "DocuSP" (a Xerox trademark)).

This job forwarding embodiment could be implemented by providing user input, to the HLC print system, regarding the HLC colorants to be used during a selected time interval (such as a day or shift). New IPP attributes, namely <potential colorant> and <time to colorant loading> could be added to the CPSS. Based on the pending/potential colorants for the selected interval, a job with a mismatched HLC might be retained on the DFE for later printing or forwarding. In one example, potential recipient HLC systems would broadcast across IPP their <potential colorant>, <time to colorant loading>, and <colorant-ready> attributes. In this way, the broadcast information could be used, by the forwarding system, to automatically determine a recipient HLC print system.

For instance, red colorant might represent a system's loaded color with green and blue as its <potential colorants>. In response to receiving a highlight color print job (HCPJ) requesting blue colorant, the HCPJ would remain at the original print system (since it would be capable of fulfilling the request later). If an "orange" request was received by the same HLC system (red, blue, green capable), the job might be forwarded to another print system having orange as <colorant-ready> or orange as a <potential colorants>.

The above-described HCPJ forwarding approach can be further extended by providing the HLC toner containers with RFID colorant information. The DFE (with RFID read capability (FIG. 3)) could poll local or physically proximate toner cartridges to populate the <potential colorants> that a HLC device is capable of producing. Depending on the RFID information the incoming job might be executed locally or forwarded to an appropriate HLC printer on a network.

Figure 5:
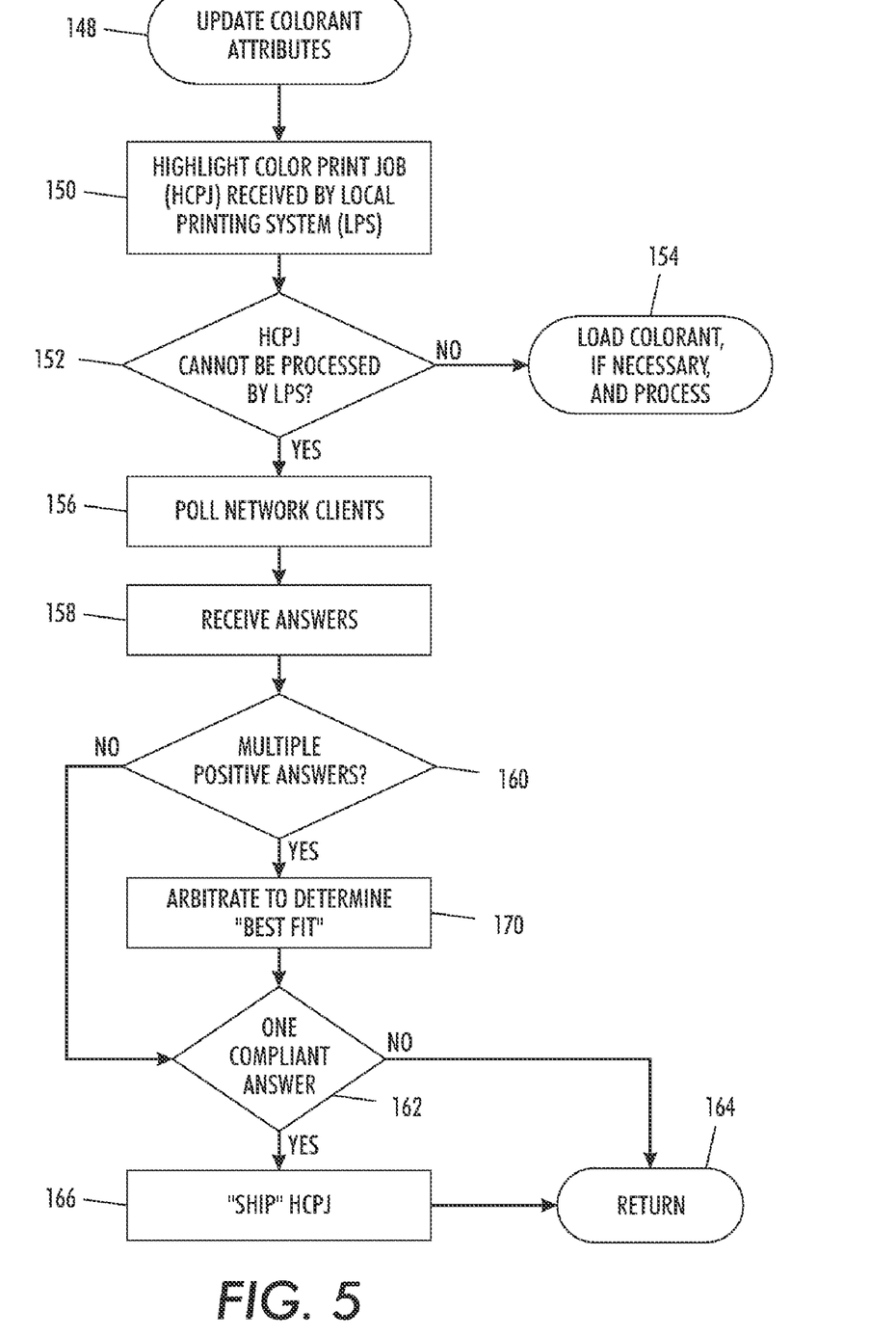
FIG. 5 a flow diagram illustrating some of the functionality associated with a highlight color print job forwarding approach.
Figure 6:
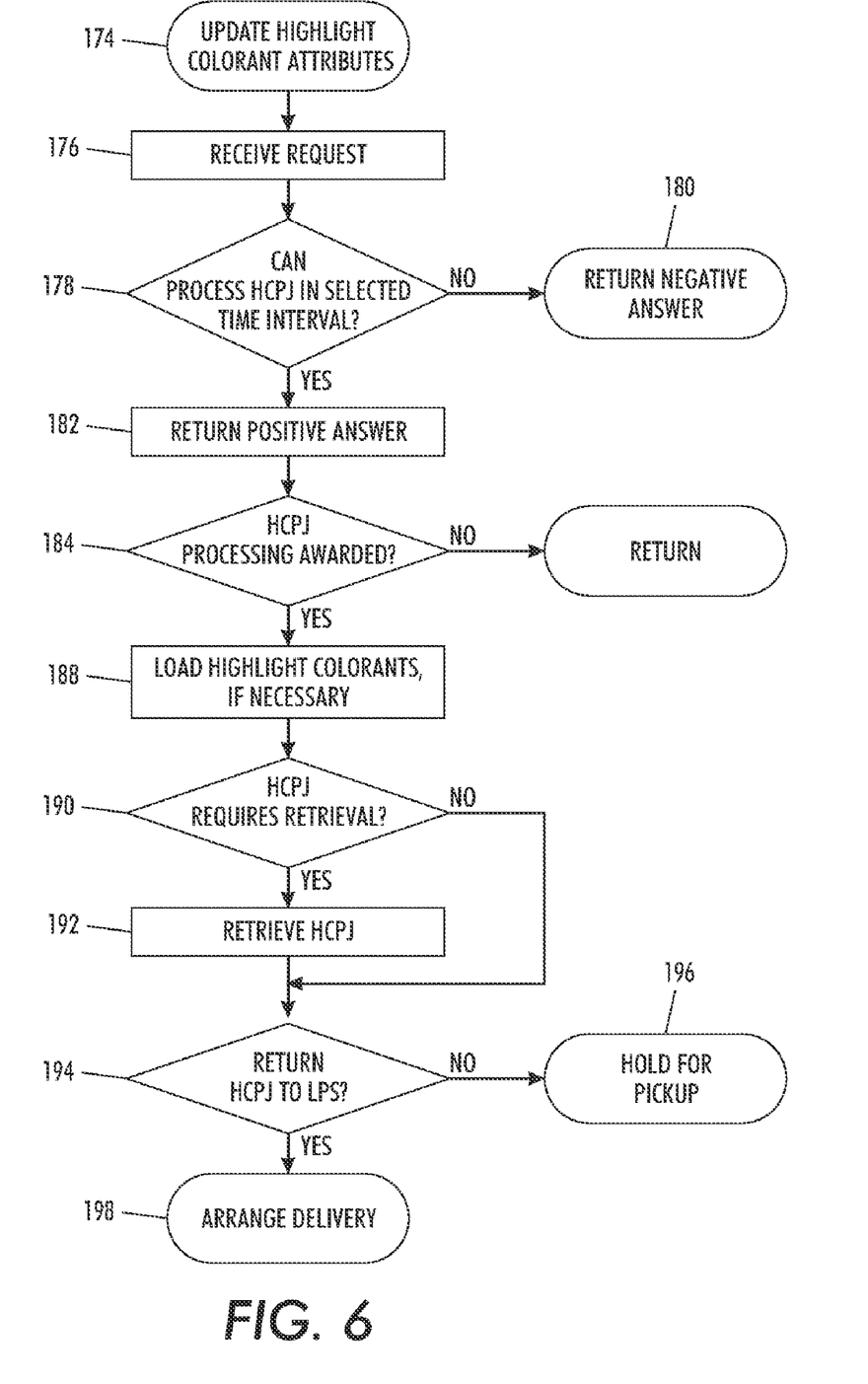
FIG. 6 is a flow diagram illustrating some of the functionality associated with servicing a highlight color print job request at a remote client.

Referring now to FIGS. 3, 5 and 6, some of the functionality of a highlight color print job forwarding approach is described. In general, the disclosed approach of FIG. 5 illustrates the operation of a local printing system (LPS) [corresponding, in one example, to the document processing system 120 of FIG. 3] relative to a plurality of remote clients 138 [i.e., clients 138-1 through 138-N (FIG. 3)], the LPS communicating with the remote clients via the network 140. In general, the disclosure of FIG. 6 illustrates certain operability of one of the remote clients 138 in a highlight color print job forwarding mode.

Referring specifically to FIG. 5, highlight colorant attributes may be (at 148) periodically updated (possibly once a day) at the LPS 120. In one example of operation, at step 150, a highlight color print job (HCPJ) is received by the LPS. If it is determined, at 152, that the HCPJ can be processed with the LPS 120, then the colorant called for the HCPJ is loaded in the LPS, if necessary (154) and the subject HCPJ is scheduled for processing. If, on the other hand, the HCPJ cannot be processed with the LPS because, among other things, the requested highlight colorant cannot be loaded in the LPS within a selected time interval, the processor 122 (FIGS. 3 and 4) [or a computer associated with the document processing system 120] can be used to poll remote clients 138 (156) to determine if the requested highlight colorant either currently resides in one of the remote clients or can be loaded in one of the remote clients within the selected time interval.

In the illustrated example of FIG. 5, the LPS 120 waits (at 158) to receive answers from one or more of the remote clients. In another example, however, such waiting might be deemed unnecessary, with the LPS automatically forwarding the HCPJ to an eligible client upon receiving a compliant answer from the eligible client. Alternatively, the LPS can automatically forward a HCPJ based on previously obtained information. That is, information about the availability of colorants at clients 138 may be performed prior to or concurrently with 148.

Referring still to FIG. 5, in a first scenario, one or less compliant answers are received (160, 162). If there is no compliant answer, then some return action (164), possibly even faulting the HCPJ, occurs. If there is one compliant answer, the HCPJ may be shipped (166) to the eligible remote client. In a second scenario, if multiple positive answers are received from the remote clients, then an arbitration (170), to determine which of the clients is best suited to execute the HCPJ, may be performed. Various factors, such as client location and processing time (including when the requested highlight colorant can be loaded), may be used to perform the arbitration. In one example, the arbitration may be achieved with an auctioning arrangement of the type disclosed in U.S. Pat. No. 6,078,906 to Huberman, the pertinent portions of which are incorporated herein by reference. As follows, the request of the client representing the best fit (i.e., a request from a suitably qualified client) will be handled by way of 162 and 166. Subsequent to 166, the process of FIG. 5 can return to servicing another request, possibly another HCPJ processing request.

Referring now to FIG. 6, an example of HCPJ request servicing at one of the remote clients 138 (FIG. 3) ("the client") is shown. While the following discussion focuses on implementation for just one client, it will be understood that the number of clients using the implementation of FIG. 6 is only constrained by the size of the network with which the document processing system or LPS 120 (FIG. 3) and clients 138 communicate. Referring first to 174, highlight colorant attribute updating may be performed by the client at periodic intervals (possibly once a day). In one example of operation, at 176, a job execution request is received by the client. If the client cannot process the HCPJ in the selected time interval (negative answer at 178) then the client (at 180) returns a negative answer (to indicate that it is not qualified, due to lack of colorant or time, to execute the HCPJ). If the client is qualified to process the HCPJ then, at 182, it returns a positive answer to the LPS 120 (FIG. 3).

Assuming the client is awarded the HCPJ (positive answer to 184), the client, at 188, loads highlight colorant, if necessary. It can be appreciated, from the description above, that the requested highlight colorant need not be loaded in the printing system of the client at the time when the HCPJ is actually awarded. That is, the award may be granted on the basis of the potential for highlight colorant loading. At 190, the client determines whether the HCPJ requires retrieving. In one example of 192, the client may be provided with the necessary information to retrieve the HCPJ from a server on the network. Alternatively, the LPS 120 may forward the HCPJ directly to the client. Upon processing the HCPJ, a decision (194) regarding output return is made. In one example, the output is held at the client for pickup (196) or delivery is arranged (198).

Various features of the above-described embodiments should now be apparent. The following features relate to one aspect of the disclosed embodiments:

Multiple client printing systems may be polled by the LPS to obtain information regarding their qualifications to successfully process a highlight color print job (HCPJ) within the selected time interval. When multiple client printing systems are qualified to successfully process the HCPJ, a determination (or arbitration) as to which client is best qualified to process the HCPJ may be made. In one example, estimated processing times for at least two multiple client printing systems are considered for determining which client should receive the HCPJ. In another example, polling may be implemented with an internet print protocol.

In an alternative approach to polling, a request by the LPS, seeking information from client printing systems regarding their qualifications to successfully process a HCPJ may be transmitted or broadcast across a network.

The method may include determining that the selected highlight colorant cannot be loaded in a local printing machine within the selected time interval. The local printing machine may be disposed in a print shop and a wireless receiver (cooperating with an emitter possibly associated with a toner or ink container) may be used to determine if the selected highlight colorant is in the print shop. In one example, the emitter and receiver might be part of an RFID system.

The HCPJ may be stored on a network for retrieval by a client printing system that is determined to be qualified for successfully processing the highlight color print job within a selected time interval.

Pursuant to practicing the method, it may be determined that a highlight colorant is unavailable in a print shop, or simply cannot be loaded in the local printing machine within the selected time interval.

The following feature relates to another aspect of the disclosed embodiments:

A selected time interval may include a first time interval and a second time interval. In turn, a HCPJ may be sent to a client printing system where a highlight colorant for the HCPJ may be loaded into the client printing system during the second time interval.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A computer implemented method for printing a highlight color print job in a system including a local printing system with a computer, the computer communicating with multiple non-local client printing systems by way of a network, the highlight color print job including information regarding a selected highlight colorant to be used in printing the highlight color print job, comprising:

determining, with the computer, if, based upon a current configuration of the local printing system having the selected highlight colorant loaded therein, the highlight color print job can be processed at the local printing system;

determining, when the current configuration of the local printing system cannot process the highlight color print job, if the selected highlight colorant, using a RFID system, is physically located in a local printing environment that includes the local printing system;

obtaining information from each of the client printing systems, when it is determined that current configuration of the local printing system cannot process the highlight color print job and the selected highlight colorant is not physically located in a local printing environment that includes the local printing system, indicating if the client printing system is qualified to successfully process the highlight color print job within a selected time interval;

selecting, based upon the obtained information, one of the client printing systems qualified to successfully process the highlight color print job within a first predetermined time interval; and forwarding the highlight color print job to the selected client printing system qualified to successfully process the highlight color print job within the first predetermined time interval.

2. The method of claim 1, further comprising:

determining, when it is determined that current configuration of the local printing system cannot process the highlight color print job and the selected highlight colorant is physically located in a local printing environment that includes the local printing system if the selected highlight colorant can be loaded in the local printing system within a second predetermined time interval; and obtaining information from each of the multiple client printing systems, when it is determined that current configuration of the local printing system cannot process the highlight color print job, the selected highlight colorant is physically located in a local printing environment that includes the local printing system, and the selected highlight colorant cannot be loaded in the local printing machine within the second predetermined time interval, indicating if the client printing system is qualified to successfully process the highlight color print job within a selected time interval.

3. A computer implemented method for printing a highlight color print job having a selected highlight colorant in a system including a one or more client printing systems communicating with a network, comprising:

receiving a request from a requester, from the network, at a client printing system, the request seeking information regarding whether the highlight color print job can be processed at the client printing system within a selected time interval;

determining if, based upon a current configuration of the client printing system having the selected highlight colorant loaded therein, the highlight color print job can be processed at the client printing system;

determining, when the current configuration of the client printing system can process the highlight color print job, if the highlight color print job can be processed at the client printing system within the selected time interval;

transmitting a response, to the requester, when it is determined that the highlight color print job can be processed at the client printing system within the selected time interval, indicating that the highlight color print job can be processed at the client printing system within the selected time interval;

determining, when the current configuration of the client printing system cannot process the highlight color print job, if the selected highlight colorant, using a RFID system, is physically located in a client printing environment that includes the client printing system;

determining, when it is determined that current configuration of the client printing system cannot process the highlight color print job and the selected highlight colorant is physically located in the client printing environment that includes the client printing system, if the selected highlight colorant can be loaded in the client printing system and the highlight color print job processed within a selected time interval;

transmitting a response, to the requester, when it is determined that the selected highlight colorant can be loaded in the client printing system and the highlight color print job processed within a selected time interval, indicating that the highlight color print job can be processed at the client printing system within the selected time interval; and processing the highlight color print job at the client printing system in response to receiving an instruction indicating that the highlight color print job is to be processed by the client printing system.

* * * * *